Figure 1:
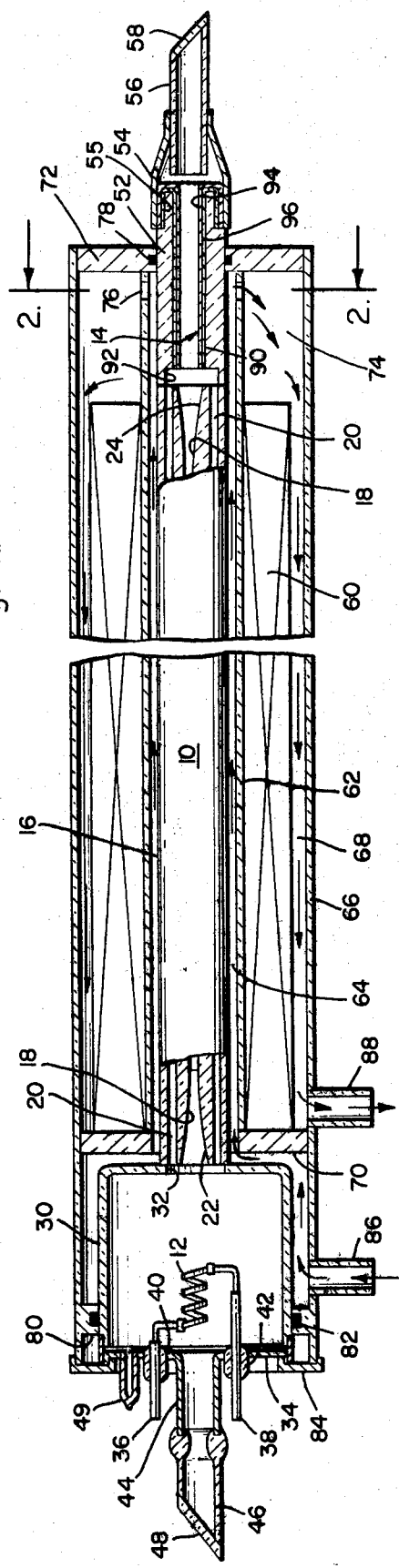

United States Patent

Halsted et al.

[15] 3,670,261
[45] June 13, 1972

[54] ANODE DESIGN FOR GAS DISCHARGE LASERS

[72] Inventors: Abel S. Halsted, Palos Verdes Peninsula; David D. Hallock, Palos Verdes Estates, both of Calif.

[73] Assignee: Hughes Aircraft Company, Culver City, Calif.

[22] Filed: Nov. 9, 1970

[21] Appl. No.: 87,816

[52] U.S. Cl. ..................................................331/94.5
[51] Int. Cl. ..................................................H01s 3/02
[58] Field of Search .....................................331/94.5

[56] References Cited

UNITED STATES PATENTS

| | | |
|---|---|---|
| 3,555,450 | 1/1971 | Rockwell..............................331/94.5 |
| 3,569,858 | 3/1971 | Witteman et al. ....................331/94.5 |
| 3,427,564 | 2/1969 | Okaya et al...........................331/94.5 |
| 3,437,950 | 4/1969 | Okaya et al...........................331/94.5 |
| 3,452,295 | 6/1969 | Sher.......................................331/94.5 |
| 3,478,279 | 4/1969 | Kobayashi et al....................331/94.5 |
| 3,501,714 | 3/1970 | Myers et al. .........................331/94.5 |

OTHER PUBLICATIONS

Piltch et al., " High Temperature Alumina Discharge Tube,"

Review of Scientific Instruments, Vol. 37, pp. 925– 926, July, 1966

*Primary Examiner*—Ronald L. Wibert
*Assistant Examiner*—Edward S. Bauer
*Attorney*—W. H. MacAllister, Jr. and Paul M. Coble

[57] ABSTRACT

The disclosed laser anode arrangement includes a tubular anode-containing body of ceramic material bonded to an end of an elongated cylindrical body which defines a laser gas containing discharge-confining longitudinal bore. The bore of the anode-containing body is axially aligned with the discharge-confining bore and has a diameter greater than that of the discharge-confining bore. An electron collecting anode surface is provided by a metal coating bonded to the inner lateral surface of the anode-containing body. The metal coating may include a base layer of a molybdenum-manganese mixture and a nickel layer bonded to the base layer. The metal coating extends around the end of the anode-containing body away from the discharge-confining body and is brazed to a metal sleeve to provide an electrically conductive path to the metal coating. A coolant such as ordinary tap water may be passed in direct contact with the outer lateral surface of the discharge-confining body and a portion of the outer lateral surface of the anode-containing body. The coolant is electrically insulated from both the metal anode coating and the electrically conductive path thereto.

5 Claims, 2 Drawing Figures

PATENTED JUN 13 1972 3,670,261

Abel S. Halsted,
David D. Hallock,
INVENTORS,
BY.

Paul M. Coffee

ATTORNEY.

ANODE DESIGN FOR GAS DISCHARGE LASERS

This invention relates to lasers, and more particularly relates to fluid cooled discharge excited gas lasers having an improved anode design such that its electron collecting surface is not in direct contact with the fluid coolant.

In many discharge excited gas lasers, significant discharge current (ions, electrons) flows between an anode and a cathode disposed at opposite ends of the laser discharge tube. Considerable heat is generated which must be removed from the vicinity of the discharge and anode regions for efficient laser operation. Since radiation cooling systems are bulky, inefficient, and limited in their power handling capabilities, efficient laser cooling is best achieved by passing a gaseous or liquid coolant in direct contact with the outer lateral surfaces of the discharge tube and the anode.

For reasons of economy water is a desirable laser coolant. However, when water with a relatively high ion content (as is the case with ordinary tap water) contacts a metal body to which an electrical potential is applied, resultant electrolysis tends to corrode the metal body. Where discharge laser anodes consist of a metal body which is brazed to the end of the laser discharge tube, the aforementioned corrosive tendencies have prevented the use of ordinary water as a practical coolant for such lasers.

Accordingly, it is an object of the present invention to provide an anode design for gas discharge lasers which permits highly efficient, rapid cooling of the electron collecting surface while preventing direct coolant contact with this surface, thereby enabling ordinary water to be used as the laser coolant.

It is a further object of the invention to provide a gas discharge laser which is simple in design, easy to fabricate, and inexpensive and reliable in operation.

An anode arrangement according to the invention includes a body of electrically insulating material defining a cylindrical bore therethrough. An electron collecting surface is provided by a metal coating which is bonded to the surface of the bore. An electrically conductive path is provided to the metal coating. When a coolant is passed in direct contact with the outer lateral surface of the anode body, the coolant is electrically insulated from both the metal coating and the electrically conductive path thereto.

Figure 2:
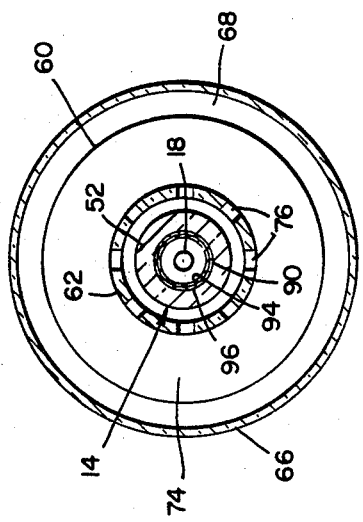

Additional objects, advantages and characteristic features of the invention will become readily apparent from the following detailed description of a preferred embodiment of the invention when considered in conjunction with the accompanying drawing in which:

FIG. 1 is a longitudinal view, primarily in section, illustrating a laser according to the invention; and FIG. 2 is a cross-sectional view taken along line 2—2 of FIG. 1.

Referring to FIG. 1 with greater particularity, a laser according to the invention may be seen to include an elongated discharge section 10 mounted between a cathode 12 and an anode arrangement 14. The discharge section 10 contains a gaseous laser medium which may be any gas capable of undergoing laser action when a suitable voltage is applied between the cathode 12 and the anode 14. Typically, the laser medium is a noble gas such as argon, krypton, or neon.

The discharge section 10 preferably consists of an elongated cylindrical body 16 which functions as both a discharge-confining element and a hermetic enveloping element for the laser. Although the discharge section 10 is shown as formed from a single elongated cylindrical body extending from the vicinity of the cathode 12 to the anode 14, alternatively, the discharge section 10 may consist of a plurality of individual elongated cylindrical bodies successively disposed along the longitudinal axis of the laser in hermetically bonded relationship with one another. The cylindrical body 16 is made of electrically insulating material having good thermal conductivity and thermal shock resistant properties. Exemplary materials which may be used are beryllia, alumina and quartz. However, beryllia is preferred on account of its greater resistance to thermal shock and ion bombardment.

Cylindrical body 16 defines an axial longitudinal bore 18 for confining the laser discharge and may further define a plurality of off-axis longitudinal bores 20 for providing a laser gas return path. The diameter of each gas return bore 20 is preferably made a slightly less than that of the discharge-confining bore 18 in order to insure that the discharge will occur in the bore 18 and not in the bores 20. Moreover, in order to reduce ion bombardment on the lateral surface of the discharge-confining bore 18, the portion of the bore 18 adjacent the cathode 12 may be tapered outwardly as shown at 22 as the cathode is approached, while the portion of the bore 18 adjacent the anode 14 may be similarly provided with an outwardly extending tapered portion 24 as the anode 14 is approached.

Cathode 12 is mounted in a cylindrical housing 30 disposed in axial alignment with the discharge-confining bore 18. The cathode 12 may be of a helical configuration, as shown, to permit the generated laser beam to pass axially therethrough. The cathode housing 30 is preferably of a ceramic material such as beryllia or alumina. The end wall of the housing 30 adjacent the discharge section 10 extends radially inwardly into contact with the bore-defining body 16 and is hermetically bonded to the end of the body 16. Exemplary bonding material which may be used is a lead solder glass such as that sold under the trade names Corning 7570 and Corning 7575 by Corning Glass Works. The end wall of the housing 30 adjacent the body 16 defines a central aperture 32 of a radius not less than the distance from the axis of bore 18 to the outer edge of each bore 20 in order to permit gas flow between the cathode chamber and the bores 18 and 20.

The end of the cathode housing 30 remote from the discharge section 10 is hermetically bonded to a header 34 which may be of a metal such as Kovar, for example. Electrical leads 36 and 38 to the cathode 12 extend through the header 34 and are insulated therefrom by means of insulating beads 40 and 42, respectively. Header 34 defines an outwardly extending tubular portion 44 axially aligned with the discharge-confining bore 18. A glass tube 46 aligned with the header extension 44 has its inner end hermetically sealed to the extension 44 and its outer end hermetically sealed to a Brewster angle window 48.

Header 34 is also provided with a gas pumping tube 49 which may be of copper, for example. During fabrication of the laser, the outer end of tube 49 is connected to vacuum pumping apparatus for initially evacuating the interior portions of the laser, after which the tube 49 is connected to a source of the desired gaseous laser medium to fill the interior portions of the laser with laser gas at the desired pressure. As an example, when argon is used as the laser gas, typical gas pressures within the laser would range from essentially 0.5 to essentially 2.0 Torr. After the completion of the gas filling operation, the outer end of tube 49 is sealed off, as shown, to complete the vacuum envelope for the laser and enable the desired laser gas pressure to be maintained.

At the end of the discharge section 10 remote from the cathode 12, there is disposed a novel anode arrangement 14 which will be described in greater detail below. For the present it suffices to state that the anode is formed in a tubular body 52 of electrically insulating ceramic material such as beryllia or alumina coaxially aligned with the bore-defining body 16. The inner end surface of the anode-containing body 52 is hermetically bonded to the adjacent end surface of the bore-defining body 16 by means of a lead solder glass, for example. A metal sleeve 54, of Kovar for example, may be brazed to recessed portion 55 of the outer lateral surface of the anode-containing body 52 adjacent the end of the body 52 away from the discharge section 10. The sleeve 54 may be tapered radially inwardly near its outer end and have its inner lateral surface adjacent this end brazed to a ceramic tube 56, of alumina for example, which is coaxially aligned with the anode-containing body 52. The outer end of the tube 56 is hermetically sealed to a Brewster angle window 58.

In order to reduce ion bombardment on the walls of the discharge-confining bore 18 and thereby increase the operating efficiency of the laser, a magnetic field may be provided along the axis of the discharge section 10. The axial magnetic field may be generated by means of a solenoid 60 coaxially mounted about the cylindrical bore-defining body 16. However, other magnetic field generating arrangements such as permanent magnet structures could be employed instead. Or, where lower efficiencies may be tolerated no magnetic field need be applied at all.

In the illustrative arrangement shown in FIG. 1, solenoid 60 is wound on a tubular core 62 of electrically insulating material such as fiber glass. The inner diameter of the core 62 is greater than the outer diameter of the bore-defining body 16 so as to provide an annular longitudinal passageway 64 for the flow of a coolant over the outer lateral surface of the body 16. A tubular housing 66 of electrically insulating material such as plastic is coaxially disposed about the solenoid 60 and is spaced from the outer lateral surface of the solenoid 60 to provide a further annular longitudinal coolant flow passageway 68.

An annular solenoid support member 70 of electrically insulating material such as plastic is attached to the solenoid core 62 and the housing 66 at the cathode end of the solenoid 60 and extends radially inwardly from the housing 66 in a manner preventing fluid communication between the passageways 64 and 68 at the cathode end of the discharge section 10. A similar annular solenoid support member 72, which may also be of plastic, is attached to the solenoid core 62 and the housing 66 at the anode end of the housing 66. The support member 72 extends radially inwardly from the housing 66 into contact with the anode-containing body 52 at a location spaced from the end of the solenoid 60 so as to provide a radial coolant flow passageway 74 in fluid communication with the longitudinal coolant flow passageway 68. A plurality of apertures 76 in the lateral surface of the solenoid core 62 adjacent the coolant flow passageway 74 provide fluid communication between the coolant passageways 74 and 64. The radially inner surface of the member 72 retains an 0-ring 78 of resilient material, such as butyl rubber for example, for forming a fluid tight seal between the member 72 and the anode-containing body 52.

The solenoid housing 66 has a diameter greater than that of the cathode housing 30 and extends outwardly of the housing 30 to a longitudinal location near the region where the housing 30 is bonded to the header 34. The housing 66 may be provided with an annular flange 80 which extends radially inwardly from the housing 66 to the cathode housing 30 in the vicinity of the header 34. Flange 80 retains an 0-ring 82 for providing a fluid tight seal with the outer surface of housing 30. An annular end cap 84 may be attached to the end of the housing 66 and the header 34 in order to preclude axial movement of the housing 66 relative to the interior parts of the laser.

A fluid coolant may be introduced into the coolant flow passageway 64 by means of an electrically insulating conduit 86, of plastic for example, extending outwardly from the housing 66 in the vicinity of the flange 80 and providing fluid communication with the annular space between the housings 66 and 30. The coolant flows longitudinally along the passageway 64 toward the anode 14, radially outwardly through apertures 76 into the passageway 74, and then longitudinally back toward the cathode chamber along passageway 68. The coolant may be removed from the passageway 68 via an electrically insulating conduit 88 extending outwardly from the housing 66 at the end of the passageway 68 adjacent the member 70.

In accordance with the principles of the invention, a unique anode arrangement 14 is provided which precludes coolant contact with the electron collecting surface while enabling highly efficient, rapid cooling of this surface. The aforementioned anode-containing ceramic body 52 defines a cylindrical bore 90 axially aligned with the discharge-confining bore 18 and of a diameter greater than that of the bore 18. An enlarged bore portion 92 having a radius not less than the distance from the axis of the bore 18 to the outer edge of each bore 20 may be provided in the end of the anode-containing body 52 adjacent the discharge-confining body 16 in order to permit gas communication between the bores 18 and 20 of the body 16.

The electron collecting (anode) surface is provided by a metal coating 94 which is bonded to the surface of the anode bore 90. Some exemplary metals which may be used for the coating 94 include but are not limited to copper, gold, silver, aluminum and nickel. Nickel is preferred, however, on account of its relatively low cost and ease in bonding to the body 52. In bonding the metal coating 94 to the body 52, it is preferred to first provide an electrically conductive base coating 96 on the surface of the bore 90 which adheres strongly to the ceramic material of the body 52. The base coating 96 may be a standard molybdenum-manganese brazing mixture having a thickness essentially in the range of from 0.0003 inch to 0.001 inch. Coating 96 may be painted on the surface of bore 90 and then sintered by firing in a hydrogen atmosphere. The metal coating 94, which may have a thickness essentially in the range of from 0.0005 inch to 0.002 inch, may then be formed, for example, by electrolytically plating the desired metal for the coating 94 onto the surface of the base layer 96.

As is shown in FIG. 1, the metal layers 94 and 96 extend around the outer end of the anode-containing body 52 and over recessed portion 55 of the outer lateral surface of the body 52 in order to facilitate brazing of the sleeve 54 to the body 52 and to provide a high conductivity electrical path between the anode coating 94 and the sleeve 54. The desired electrical potential may be applied to the anode layer 94 by connecting a lead from the anode power supply to the sleeve 54.

In the operation of the aforedescribed laser, an electrical discharge may be initiated in the section 10 by applying either a high voltage pulse (e.g., around 3Kv) or a large DC voltage (e.g., around 2Kv) between the anode 14 and the cathode 12. After the discharge has commenced, a DC voltage ranging from around 100 to 300 volts applied between anode 14 and cathode 12 will normally be sufficient to sustain the discharge. During steady state operation typical anode-cathode current flow may be in the range of 30 to 50 amperes, for example. This electrical discharge excites the laser gas to a condition of stimulated emission, producing laser energy along the axis of the laser. The laser may be operated as an amplifier as shown, or as an oscillator by locating suitable reflectors at opposite ends of the laser.

As the laser operation proceeds, heat is removed from the discharge-confining body 16 and the anode-containing body 52 by the coolant which traverses the coolant channel 64, 76, 74, 68 from input conduit 86 to output conduit 88 in direct contact with the outer lateral surface of the body 16 and a portion of the outer lateral surface of the body 52. Since the coolant does not come into contact with any electrically conductive material over the entire coolant flow channel through the device, no danger of corrosion due to electrolysis exists even when ordinary tap water is used as the coolant. At the same time, highly efficient, rapid cooling of the interior regions of both the discharge-confining body 16 and the anode-containing body 52 is achieved in a laser which is easy to fabricate and inexpensive and reliable in operation.

Although the present invention has been shown and described with reference to a particular embodiment, nevertheless various changes and modifications obvious to one skilled in the art to which the invention pertains are deemed to lie within the spirit, scope and contemplation of the invention.

What is claimed is:

1. In a discharge excited gas laser, an anode arrangement comprising: a body of electrically insulating material having a cylindrical bore therethrough; a metal anode coating bonded to the surface of said bore; and means for providing an electrically conductive path to said coating to apply an electrical potential thereto, said means including an extension of said metal coating around an end of said body and over a recessed portion of the outer lateral surface of said body, and an electrically conductive sleeve brazed to the portion of said coating extending over said recessed portion of said body.

2. A gas laser comprising: an elongated cylindrical body of electrically insulating material having a discharge-confining axial longitudinal bore therethrough, said discharge-confining bore containing a gas capable of undergoing laser action, a cathode-containing housing bonded to one end of said cylindrical body, a tubular body of electrically insulating material bonded to the opposite end of said cylindrical body, said tubular body being axially aligned with said cylindrical body and having an inner diameter greater than the diameter of said discharge-confining bore, a metal anode coating bonded to the inner lateral surface of said tubular body, means for passing a coolant in direct contact with the outer lateral surface of said elongated cylindrical body and a portion of the outer lateral surface of said tubular body, and means for providing an electrically conductive path to said metal coating to apply an electrical potential thereto, said path being electrically insulated from said coolant.

3. A gas laser according to claim 2 wherein said tubular body is of ceramic material and said metal coating includes a layer of molybdenum-manganese brazing material bonded to the inner lateral surface of said tubular body and a layer of nickel bonded to said molybdenum-manganese layer.

4. A gas laser according to claim 3 wherein said molybdenum-manganese layer has a thickness essentially in the range of from 0.0003 inch to 0.001 inch and said nickel layer has a thickness essentially in the range of from 0.0005 inch to 0.002 inch.

5. A gas laser according to claim 2 wherein said means for providing an electrically conductive path includes an extension of said metal coating around the end of said tubular body away from said cylindrical body and over a recessed annular portion of the outer lateral surface of said tubular body adjacent said end thereof, and an electrically conductive sleeve brazed to the portion of said coating extending over said recessed portion of said tubular body.

* * * * *